Patented Sept. 1, 1936

2,052,997

UNITED STATES PATENT OFFICE 2,052,997

METHOD OF REMOVING RUBBER CONTAINING MATERIAL FROM METAL SURFACES

Frederick K. Bezzenberger, Cleveland Heights, Ohio

No Drawing. Application February 5, 1932, Serial No. 591,239

8 Claims. (Cl. 87—5)

This invention relates to the art of removing rubber containing materials from metal surfaces. It relates particularly to the removal of such material from metal molds in which rubber articles are vulcanized.

Metal molds in which rubber articles are vulcanized are commonly composed of such materials as cast iron, steel, aluminum alloys and the like. During the vulcanization process a film forms on the mold surfaces in contact with the rubber articles and under repeated use of the molds this film increases in thickness until it must be removed to prevent the rubber articles from being undersize. The material which so adheres to the mold contains filler material present in the rubber articles, for example, carbon black and also rubber compounds and sulphur. The film is hard and quite adherent to the mold.

Heretofore such adhering material has been removed by more or less slow, laborious and expensive methods. One of such methods consists in dipping the mold into a bath of molten lead with the result that the film was charred to some extent and thereafter removing the charred film by brushes or other tools. Another method which has been used consisted of heating the mold surface coated with such material with a suitable torch to char the film after which the charred material was brushed or scraped off. Both of these methods were slow, involved much labor and required the attention of workmen who were more or less skilled in order to prevent possible damage to the molds. The lead bath method was, moreover, disadvantageous because of the poisonous lead fumes which were liberated.

It is, of course, well known that there are many substances considered to have a solvent action on rubber compounds, but such substances have not been successfully used, so far as I am informed, in commercially removing this hard, adherent film from rubber molds. Their action is comparatively slow and consists merely of simple solvent action not involving chemical reaction.

The present invention is based on the discovery that the film material may be removed or rendered capable of easy removal by means of bringing about certain chemical reactions between the film material and suitable chemical substances. I believe that these reactions change the form or nature of the rubber compounds and/or organic materials in the film. For example, by treating the film with certain substances the adherence of the film to the mold parts is partially or wholly destroyed, due I believe to a reaction involving unsaturated rubber compounds in the film; and by treating the film with other substances the film is removed due, I believe, to substantial oxidation of organic materials therein, with resultant release of other components of the film such as mineral matter, etc., which in themselves have little or no adherence to the mold. Obviously these reactions may take place at the same time, where the chemical substance or substances used have the properties of reacting with the unsaturated rubber compounds and of oxidizing organic materials in the film.

The present method may be carried out with various substances and under a variety of conditions, such as time, temperature and the like. As illustrative of suitable substances for this purpose I mention the halogens such as chlorine and bromine, concentrated acids such as sulphuric acid having a concentration of above about 60%, violent oxidizing agents such as ozone and peroxides or similar substances and complex organic compounds such as tetrachlorethylene, tetrachlorethane, and tetralin, which are capable of direct combination with unsaturated rubber compounds or which are capable of disassociation into compounds capable of combination with unsaturated rubber compounds.

As illustrative of one method of practicing the present invention I provide a bath of sulphuric acid having a concentration of about 95% to about 97% $H_2SO_4$ corresponding to a specific gravity of about 1.84. I place the metal mold having the hard film of rubber material adhering thereto into such a bath while the temperature of the latter is between about 70° F. and about 275° F., but preferably at about 150° F. Within a comparatively short period of time, such as about a quarter of an hour, the adherence of the film to the metal is destroyed and the material has wrinkled up into a mass which can easily be removed from the metal. The metal is then thoroughly rinsed in water to remove the acid, loose portions of the film being removed at the same time. Then the metal may be sprayed with water and the film completely removed by simultaneous light brushing as with a bristle brush. I believe that this treatment results partly at least in chemical oxidization of organic material in the film and possibly in chemical sulphonation of unsaturated rubber compounds in the film.

The concentrated acid has practically no effect on the metal surface even when hot and whether or not the material is cast iron, steel or aluminum alloy, largely, I believe, because of the fact that the concentrated acid does not show any actions typical of a true acid.

I may add to the bath of sulphuric acid additional oxidizing agents such as potassium or sodium dichromate, chlorates, nitrates or any other materials capable of enhancing the reaction of the acid with the rubber as pointed out above. A bath so made with sulphuric acid and dichromate will necessarily contain chromic acid. This chromic acid causes an oxidizing action on the organic material in the film, which I believe is additional to such action which is traceable to the sulphuric acid. Such a bath, therefore, will possess the desirable properties of both the sulphuric and chromic acids.

The concentration of the sulphuric acid bath can be maintained for long periods of time, particularly if the container is kept covered as much as possible to prevent the absorption of atmospheric moisture. The dilution of the acid bath by absorption of atmospheric moisture is greatly minimized by maintaining the temperature of the bath at not less than about 150° F.

After the metal surfaces have been freed from the adhering rubber material they are treated to remove substantially all water therefrom. In the case of a one-piece mold it may be sufficient for most purposes to heat the mold in boiling water and then allow it to dry in the air, any water remaining on the mold after it is removed from the boiling water being evaporated by the heat in the mold. Alternatively the mold may be subjected to the action of a solution of weak alkali, preferably of such a character as to give an insoluble precipitate with any sulphuric acid remaining on the mold. As an example of such alkali I may mention calcium hydroxide. As another alternative the mold may be heated to about 275° F. which is sufficient to vaporize any traces of acid remaining on the mold after rinsing. Some of these methods may be used equally well on multi-part molds if care is taken to remove water and all traces of acids from the interstices of the mold parts.

Complex organic substances, for example, tetrachlorethylene, by which I mean $C_2CL_4$, may be used in carrying out the present invention by providing a bath thereof heated to a temperature slightly under its boiling point and placing therein a metal surface having the hard film of rubber material adhering thereto. The adherence of the film to the metal is weakened and largely destroyed within a short time after which the metal may be removed from the highly heated liquid and rinsed and the complete removal of the film effected in any suitable manner as by rinsing and light brushing.

Where the molds are composed of metals not readily attackable by alkali I may use concentrated solutions of sodium peroxide and the like, preferably heated well above room temperature and dip the metal with the adhering material on it into such a bath and after the adherence of the material to the metal has been weakened or destroyed the metal may be removed by subsequent rinsing and light brushing. I believe that the adherence of the material to the metal is destroyed by intense oxidizing action which takes place with the resultant chemical reaction between the oxygen and the rubber material.

Although I have set forth hereinabove several different substances which may be employed in carrying out the present invention, I believe a use of concentrated sulphuric acid is to be preferred in the commercial use of this method. Having thus described my invention so that those skilled in the art may be able to practice the same, what I desire to secure by Letters Patent is defined in what is claimed.

1. The method of cleaning metal molds for rubber articles which includes the step of immersing a metal mold having rubber containing material adhering thereto in sulphuric acid having a concentration of above about 60% until the adherence of the material to the mold has been weakened.

2. The method of cleaning metal molds for rubber articles which includes the step of immersing a metal mold having rubber containing material adhering thereto in sulphuric acid having a concentration of above about 60% until the adherence of the material to the mold has been weakened, removing the mold from the acid, washing the mold to remove substantially all acid therefrom and finally separating the material from the mold.

3. The method of cleaning metal molds for rubber articles having rubber containing material adhering thereto which includes the step of immersing such a mold in sulphuric acid having a concentration of above about 95% until the adherence of the material to the mold has been largely destroyed.

4. The method of cleaning metal molds for rubber articles having adhering thereto rubber containing material which includes the step of treating such material with sulphuric acid having a concentration greater than about 60% $H_2SO_4$ and at a temperature between about 70° F. and about 275° F. until the material is loosened sufficiently to permit removal by mechanical brushing.

5. The method of cleaning metal molds for rubber articles having adhering thereto rubber containing material which includes the step of treating the portions of the mold provided with such material with sulphuric acid having a concentration greater than about 60% $H_2SO_4$ and at a temperature between about 70° F. and about 275° F. and containing an inorganic alkali metal oxidizing salt capable of reacting chemically with unsaturated rubber compounds in said material until adherence of the material to the mold is largely destroyed.

6. The method of cleaning metal molds for rubber articles having adhering thereto rubber containing material which includes the step of treating the portions of the mold provided with such material with sulphuric acid having a concentration greater than about 60% $H_2SO_4$ and at a temperature between about 70° F. and about 275° F., and containing an inorganic alkali metal oxidizing salt, capable of reacting chemically with unsaturated rubber compounds in said material, rinsing the mold with water after the adherence of the material to the mold has been diminished and finally separating the material from the mold.

7. The method of cleaning molds for rubber articles which includes the step of treating rubber-containing material adhering to such molds with a solution containing sulphuric acid having a concentration greater than about 60% $H_2SO_4$ and a substance selected from the group consisting of alkali metal dichromates, chlorates and nitrates, and capable of chemically oxidizing organic rubber substances in the film material to the extent of weakening the adherence thereof to the mold and permitting ready removal of the film material by mechanical means.

8. The method of cleaning multi-part metal molds for rubber articles which includes the steps of subjecting the assembled parts of such a mold having adhering thereto a film, containing organic rubber substances, to a liquid containing sulphuric acid having a concentration greater than 60% $H_2SO_4$ and a substance selected from the group of substances consisting of alkali metal dichromates, chlorates and nitrates and capable of reacting chemically with organic rubber ingredients of said film to weaken the adherence of the film to the mold parts, removing the film material from the mold parts and then subjecting the assembled mold parts to a solution of a weak alkali capable of reacting with said liquid in interstices between the mold parts to form an insoluble precipitate in said interstices.

FREDERICK K. BEZZENBERGER.